(12) United States Patent
Pereira et al.

(10) Patent No.: US 8,381,289 B1
(45) Date of Patent: Feb. 19, 2013

(54) COMMUNICATION-BASED HOST REPUTATION SYSTEM

(75) Inventors: Shane Pereira, Newbury Park, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 747 days.

(21) Appl. No.: 12/416,020

(22) Filed: Mar. 31, 2009

(51) Int. Cl.
*H04L 29/06* (2006.01)

(52) U.S. Cl. .......................................... 726/22

(58) Field of Classification Search ............... 726/22, 726/23, 24, 25; 713/187, 188; 709/224, 709/225
See application file for complete search history.

(56) References Cited

U.S. PATENT DOCUMENTS

| | | | |
|---|---|---|---|
| 7,197,539 B1 | 3/2007 | Cooley | |
| 7,412,516 B1 | 8/2008 | Brown et al. | |
| 7,472,420 B1 | 12/2008 | Pavlyushchik | |
| 7,546,349 B1 | 6/2009 | Cooley | |
| 7,562,304 B2 * | 7/2009 | Dixon et al. | 715/738 |
| 7,587,367 B2 | 9/2009 | Mengerink | |
| 7,668,951 B2 * | 2/2010 | Lund et al. | 709/223 |
| 7,783,741 B2 | 8/2010 | Hardt | |
| 7,870,608 B2 | 1/2011 | Shraim et al. | |
| 8,001,606 B1 | 8/2011 | Spertus | |
| 8,019,689 B1 | 9/2011 | Nachenberg | |
| 8,200,587 B2 | 6/2012 | Deyo | |
| 2002/0046041 A1 | 4/2002 | Lang | |
| 2003/0167308 A1 | 9/2003 | Schran | |
| 2004/0054661 A1 | 3/2004 | Cheung | |
| 2005/0050335 A1 | 3/2005 | Liang et al. | |
| 2005/0268090 A1 | 12/2005 | Saw et al. | |
| 2005/0283837 A1 | 12/2005 | Olivier et al. | |
| 2006/0026123 A1 | 2/2006 | Moore et al. | |
| 2006/0085328 A1 | 4/2006 | Cohen et al. | |
| 2006/0212270 A1 | 9/2006 | Shiu et al. | |
| 2006/0212925 A1 | 9/2006 | Shull et al. | |
| 2006/0212930 A1 | 9/2006 | Shull et al. | |
| 2006/0212931 A1 * | 9/2006 | Shull et al. | 726/10 |
| 2006/0230039 A1 | 10/2006 | Shull et al. | |
| 2006/0253458 A1 | 11/2006 | Dixon et al. | |
| 2006/0253581 A1 | 11/2006 | Dixon et al. | |
| 2006/0253583 A1 | 11/2006 | Dixon et al. | |
| 2006/0253584 A1 | 11/2006 | Dixon et al. | |
| 2007/0011739 A1 | 1/2007 | Zamir et al. | |
| 2007/0016953 A1 | 1/2007 | Morris et al. | |
| 2007/0050444 A1 | 3/2007 | Costea et al. | |
| 2007/0067843 A1 | 3/2007 | Williamson et al. | |
| 2007/0094734 A1 | 4/2007 | Mangione-Smith et al. | |
| 2007/0107053 A1 | 5/2007 | Shraim et al. | |
| 2007/0124579 A1 | 5/2007 | Haller | |
| 2007/0143629 A1 | 6/2007 | Hardjono et al. | |
| 2007/0156886 A1 | 7/2007 | Srivastava | |
| 2007/0162349 A1 | 7/2007 | Silver | |

(Continued)

OTHER PUBLICATIONS

International Search Report and Written Opinion, PCT Application No. PCT/US09/48328, Dec. 22, 2010, 8 pages.

(Continued)

*Primary Examiner* — Ali Abyaneh
(74) *Attorney, Agent, or Firm* — Fenwick & West LLP (57) ABSTRACT

A host reputation score indicating whether a host connected to the client by a network is malicious is received. An entity on the client that communicates with the host is identified. Whether the entity is a malware threat is determined based at least in part on the host reputation score.

20 Claims, 7 Drawing Sheets

U.S. PATENT DOCUMENTS

| | | | |
|---|---|---|---|
| 2007/0192855 | A1 | 8/2007 | Hulten et al. |
| 2007/0233782 | A1 | 10/2007 | Tali |
| 2008/0005223 | A1 | 1/2008 | Flake et al. |
| 2008/0028463 | A1 | 1/2008 | Dagon et al. |
| 2008/0082628 | A1 | 4/2008 | Rowstron et al. |
| 2008/0082662 | A1 | 4/2008 | Dandliker et al. |
| 2008/0104180 | A1 | 5/2008 | Gabe |
| 2008/0109244 | A1 | 5/2008 | Gupta |
| 2008/0109473 | A1 | 5/2008 | Dixon et al. |
| 2008/0109491 | A1 | 5/2008 | Gupta |
| 2008/0114709 | A1 | 5/2008 | Dixon et al. |
| 2008/0133540 | A1 | 6/2008 | Hubbard et al. |
| 2008/0133972 | A1 | 6/2008 | Verbowski et al. |
| 2008/0137864 | A1 | 6/2008 | Jin et al. |
| 2008/0140442 | A1 | 6/2008 | Warner |
| 2008/0140820 | A1 | 6/2008 | Snyder et al. |
| 2008/0141366 | A1 | 6/2008 | Cross et al. |
| 2008/0189788 | A1 | 8/2008 | Bahl |
| 2008/0255977 | A1 | 10/2008 | Altberg et al. |
| 2008/0263677 | A1 | 10/2008 | Kaditz et al. |
| 2009/0125382 | A1 | 5/2009 | Delepet |
| 2009/0254993 | A1 | 10/2009 | Leone |
| 2009/0282476 | A1 | 11/2009 | Nachenberg et al. |
| 2009/0328209 | A1 | 12/2009 | Nachenberg |
| 2010/0153354 | A1 | 6/2010 | Buccella et al. |
| 2011/0040825 | A1 | 2/2011 | Ramzan et al. |
| 2011/0055923 | A1 | 3/2011 | Thomas |
| 2011/0067101 | A1 | 3/2011 | Seshadri et al. |

OTHER PUBLICATIONS

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," $4^{th}$ Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the $15^{th}$ ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Pandit, S. et al., "NetProbe: A Fast and Scalable System for Fraud Detection in Online Auction Networks," WWW '07, Proceedings of the $16^{th}$ International Conference on World Wide Web, ACM, 2007, pp. 201-210, New York, N.Y.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

Siddiqui, M. et al., "A Survey of Data Mining Techniques for Malware Detection Using File Features," ACM-SE 46: Proceedings of the $46^{th}$ Annual Southeast Regional Conference on XX, ACM, 2008, pp. 509-510, New York, N.Y.

Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.

Tesauro, G. et al., "Neural Networks for Computer Virus Recognition," IEEE Expert, 1996, pp. 5-6, vol. 11, No. 4.

Tong, H. et al., "Fast Best-Effort Pattern Matching in Large Attributed Graphs," Proceedings of the $13^{th}$ ACM SIGKDD International Conference on Knowledge Discovery and Data Mining, ACM, 2007, 10 pages.

Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.

Weaver, N. et al., "A Taxonomy of Computer Worms," Proceedings of the 2003 ACM Workshop on Rapid Malcode, ACM, 2003, pp. 11-18, New York, N.Y.

Yan, X. et al., "gSpan: Graph-Based Substructure Pattern Mining," Proceedings of the 2002 IEEE International Conference on Data Mining (ICDM '02), 2002, 4 pages.

Yan, X. et al., "Mining Closed Relational Graphs with Connectivity Constraints," Proceedings of the Eleventh ACM SIGKDD International Conference on Knowledge Discovery in Data Mining, ACM, 2005, p. 333.

Yedidia, J. et al., "Understanding Belief Propagation and Its Generalizations," Exploring Artificial Intelligence in the New Millennium, 2003, pp. 236-239, vol. 8.

Zeng, Z. et al., "Coherent Closed Quasi-Clique Discovery from Large Dense Graph Databases," Proceedings of the $12^{th}$ ACM SIGKDD International Conference on Knowledge Discovery and Data Mining, ACM, 2006, 6 pages.

Zhu, X., "Semi-Supervised Learning with Graphs," 2005, 174 pages.

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

"TrustedSource™: The Next-Generation Reputation System," Secure Computing Corporation, Oct. 2006, 6 pages.

Walsh, L., "Tidal Waves: Careful, Trend Micro Might Give You a Bad Web Reputation," ChannelWeb Network, Mar. 26, 2007, [Online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

* cited by examiner

COMMUNICATION-BASED HOST REPUTATION SYSTEM

BACKGROUND OF THE INVENTION

1. Field of the Invention

This invention pertains in general to computer security and in particular to the identification of malware.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Some security software functions to identify malware threats based on signatures that define information that is unique to known malware threats. Typically, a security software provider transmits a set of signatures to a client running the provider's software. The signatures are then used by the provider's security software to scan the client system for files matching the signatures. Files matching signatures are "convicted" (identified) as malware threats.

Security software may perform behavior-based identification of malware in conjunction with, or instead of, signature-based methods. In behavior-based identification of malware threats, the security software seeks to identify malware threats by monitoring behaviors or actions performed by software applications as they execute on a client system. Software applications that perform one or more behaviors or actions that are associated with a high likelihood of being performed by a malware threat are convicted.

While signature-based identification of malware and behavior-based identification of malware provide complimentary methods of identifying malware threats, these methods are complicated by the large number of new malware threats or variations of existing malware threats (i.e. polymorphic malware) that are continuously being disseminated into computing environments. This continuous introduction of new malware threats into computing environments makes the identification of a comprehensive set of malware signatures and behaviors corresponding to all malware threats unscalable. Accordingly, there is a need in the art for improved methods of identifying malware threats.

BRIEF SUMMARY

The above and other needs are met by systems, methods, and computer program products for identifying a malware threat.

One aspect provides a computer-implemented method for identifying a malware threat at a client. A host reputation score indicating whether a host connected to the client by a network is malicious is received. An entity on the client that communicates with the host is identified. Whether the entity is a malware threat is determined based at least in part on the host reputation score.

In another aspect, the described embodiments provide a computer system for determining a host reputation score for a host connected to a network. The system comprises a memory and a processor. The system further comprises a reporting module stored on the memory and executable by the processor to receive information identifying a plurality of hosts connected to the network and describing communications between a plurality of entities on a plurality of clients and the plurality of hosts, and also to receive information identifying ones of the plurality of entities as malware threats, the reporting module further executable by the processor to provide generated host reputation scores to the plurality of clients. The system further comprises a host reputation module stored on the memory and executable by the processor to generate the host reputation score for the host based at least in part on the information identifying the plurality of hosts, the information describing communications between the plurality of entities on the plurality of clients and the plurality of hosts, and the information identifying ones of the plurality of entities as malware threats, wherein the host reputation score for the host indicates a likelihood that the host is malicious.

Another aspect is embodied as a computer-readable storage medium encoded with computer program code for identifying a malware threat according to the above method.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
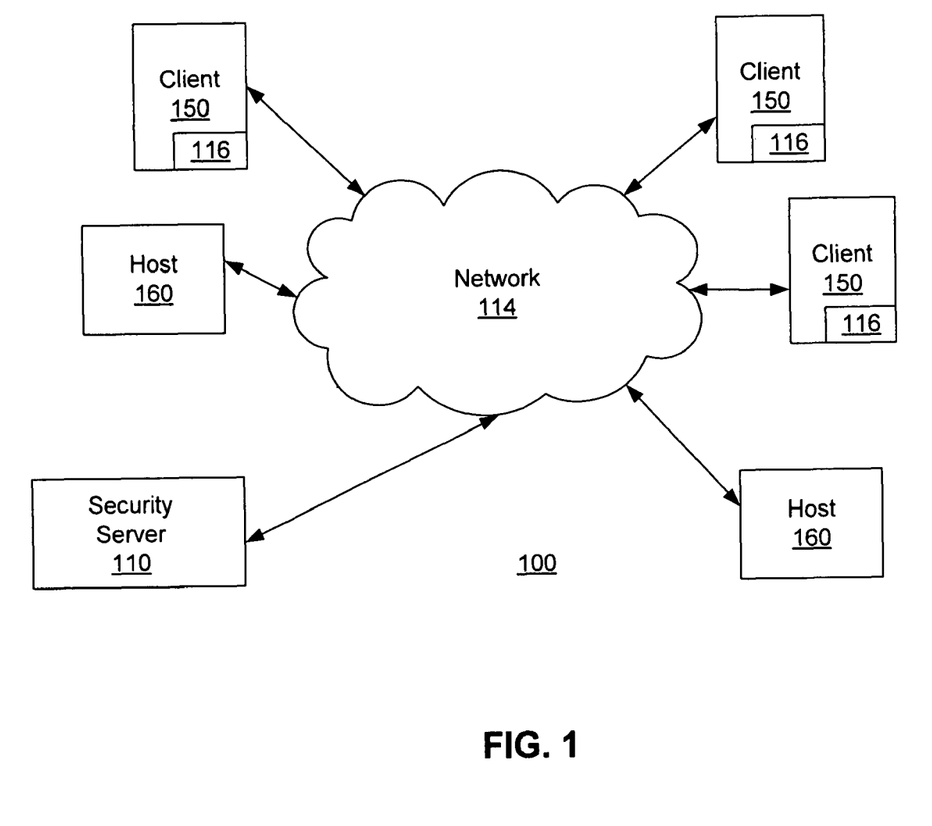
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

In one embodiment, a client 150 is a computer used by one or more users to perform activities including downloading, installing, and/or executing entities such as files and/or software applications. The client 150, for example, can be a personal computer executing a web browser such as MICROSOFT INTERNET EXPLORER that allows the user to retrieve and display content from web servers and other hosts 160 on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

Each of the clients 150 executes a security module 116 to identify entities such as files or software applications installed on the client to monitor the behaviors of the entities. The security module 116 monitors the entities at the client 150 to identify the hosts 160 that the entities communicate with through the network 114. The security module 116 transmits information identifying the hosts 160 that the entities on the client 150 communicate with to the security server 110.

In addition, the security module 116 receives host reputation scores from the security server 110. The host reputation scores indicate likelihoods that given hosts are malicious. The security module 116 uses the host reputation scores, the identities of the hosts that entities on the client 150 communicate with, and other methods such as behavior-based malware detection and signature-based malware detection to identify entities on the client that are malware threats. The security module 116 also transmits information indicating whether the entities are malware threats to the security server 110. The security module 116 may also perform remediation actions such as removing a malware threat from the client 150.

A host 160 can be any type of computer system that stores software applications, executable code, files, and/or other data, such as a web site provider. Hosts 160 can include "malicious hosts", meaning that the hosts 160 primarily communicate with malware threats at clients 150. Malicious hosts can communicate with malware threats, for example, to receive information from the malware threats such as logins, passwords, bank account identifiers, and credit card numbers or to deploy malicious code to the clients 150 on which the malware threats are installed. Hosts 160 can also include "innocuous hosts", meaning that the hosts 160 primarily communicate with entities that are not malware threats.

The security server 110 interacts with the clients 150 via the network 114 to receive information describing the entities installed on the clients 150 and their communications with hosts 160. The security server 110 generates host reputation scores for the hosts 160 based on whether any of the entities that communicate with the hosts 160 that have been identified as malware threats. A host 160 that communicates primarily with malware threats (i.e., convicted entities) may be assigned a host reputation score which indicates that the host is malicious host. Conversely, a host 160 that communicates primarily with entities that have not been identified as malware threats (i.e. unconvicted entities) may be assigned a host reputation score which indicates that the host is innocuous. A host 160 which communicates with both malware threats and unconvicted entities may be assigned a reputation score which describes the likelihood that the host is malicious. The security server 110 provides the host reputation scores associated with hosts 160 to the security modules 116 executed by the clients 150.

This approach combines information obtained from monitoring communications between entities and hosts 160 and information obtained from identifying malware threats in order to generate host reputation scores for hosts. Using the host reputation scores, the security module 116 can immediately convict entities that attempt to communicate with malicious hosts 160. As malicious hosts 160 are often unaffected by changes or polymorphisms in the malware threats that communicate with the hosts, convicting malware threats based on their communication with malicious hosts allows for identification of polymorphic malware threats. Thus, the approach is well-suited to computing environments in which clients 150 are exposed to numerous malware threats that exhibit polymorphic variance.

The network 114 represents the communication pathways between the security server 110, clients 150, and hosts 160. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
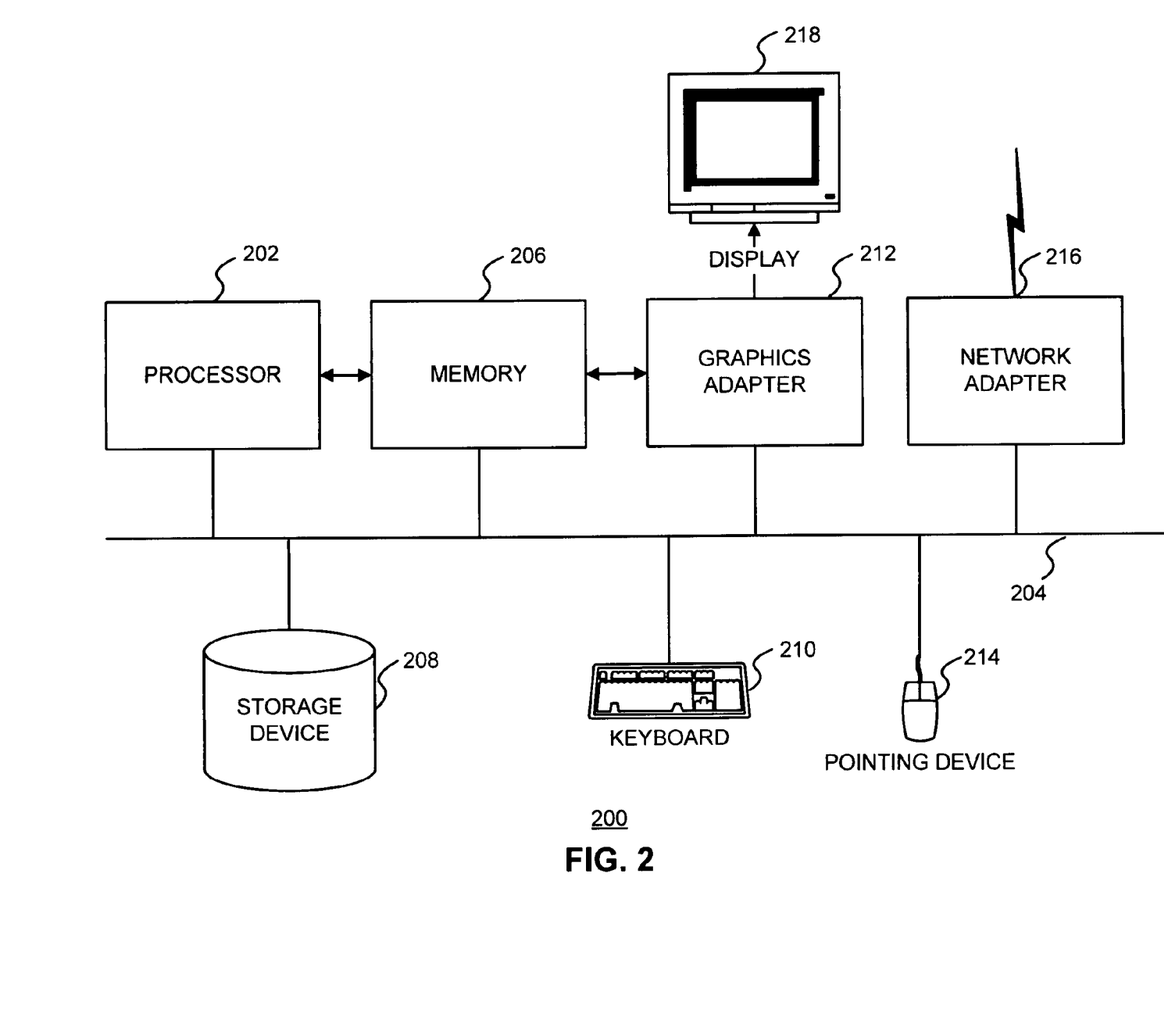
FIG. 2 is a high-level block diagram illustrating a typical computer 200 for use as a security server 110, client 150, or host 160.

FIG. 2 is a high-level block diagram illustrating a typical computer 200 for use as a security server 110, client 150, or host 160. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other computer-readable storage medium, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
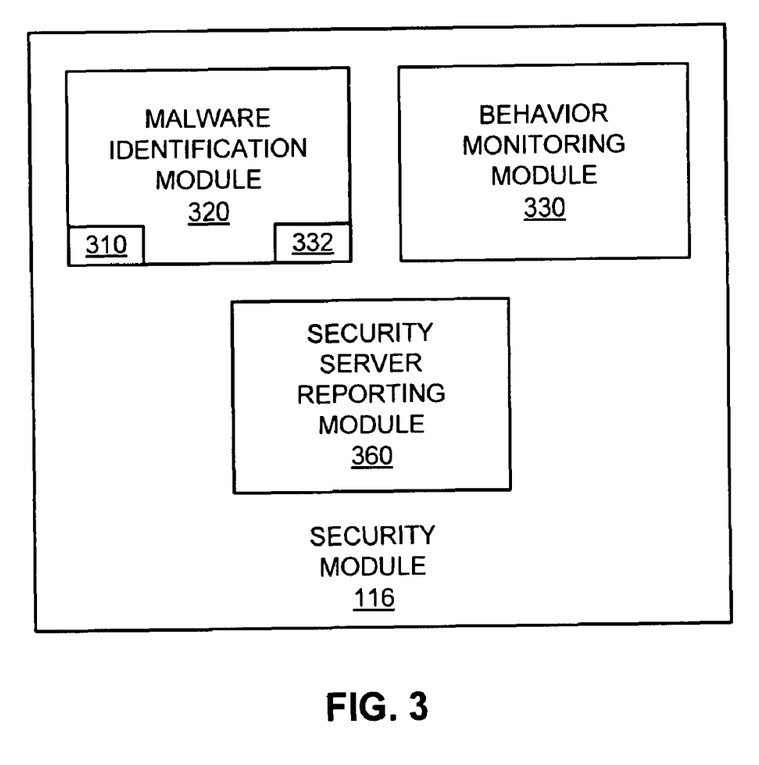
FIG. 3 is a high-level block diagram illustrating a detailed view of a security module 116 according to one embodiment.

FIG. 3 is a high-level block diagram illustrating a detailed view of the security module 116 according to one embodiment. In some embodiments, the security module 116 is incorporated into an operating system executing on the client 150 while in other embodiments the security module 116 is a standalone application or part of another product. As shown in FIG. 3, the security module 116 includes multiple modules. Those of skill in the art will recognize that other embodiments of the security module 116 can have different and/or other modules than the ones described here, and that the functionalities can be distributed among the modules in a different manner.

The malware identification module 320 functions to identify entities installed on the client 150 and to determine whether the entities are malware threats. The malware identification module 320 scans the storage device 208 or memory 206 associated with the client 150 to identify entities such as files or software applications that are installed or stored on the storage device 208 or memory 206. In some embodiments, the malware identification module 320 identifies entities based on monitored network communications involving the entities. According to the embodiment, the malware identification module 320 may scan the storage device 208 or memory 206 associated with the client 150 at a scheduled time or at other times, such as whenever an entity is installed, stored, or executed on the client 150. In some embodiments, the malware identification module 320 quarantines newly-identified entities. The entity may be quarantined, for example, by executing the entity in a secure or "sandbox" environment and/or taking other actions to prevent any malicious code in the entity from causing harm to the client 150.

The malware identification module 320 further functions to determine whether the identified entities are malware threats. This determination can be based on malware threat information 310 describing characteristics of known malware threats. The malware identification module 320 receives the malware threat information 310 from the security server 110. The malware threat information 310 includes a set of behaviors and/or actions which have a high likelihood of being performed by malware threats. These behaviors and/or actions can include: modifications to the computer system made by the entity, modifications to files on the computer system made by the entity, network interactions associated with the entity, communications between the entity and the operating system, system resources (e.g. central processing unit (CPU) cycles, memory) used by the entity, applications or files that the entity generates (e.g. child malware) and software applications with which the entity interacts. In some embodiments, the malware threat information 310 also includes a set of malware signatures or "fingerprints" that define features or characteristics that are specific to malware threats. In these embodiments, the malware identification module 320 scans the entities installed on the client 150 to determine whether the entities have the signatures.

Moreover, the malware identification module 310 can also detect malware threats based on the hosts 116 with which the entities communicate. In one embodiment, the malware identification module 320 receives host reputation scores 332 for hosts 160 from the security server 110. The host reputation scores 332 indicate whether hosts 160 are malicious or innocuous. In one embodiment, a host reputation scores is represented as a continuous score with "0" indicating that a host is innocuous, "1" indicating that a host is malicious, and a value between 0 and 1 indicating a likelihood that the host is malicious, with a higher score indicating a greater likelihood that the host is malicious. In some embodiments, the host reputation scores 332 are received with the malware threat information 310.

The malware identification module 320 uses the host reputation scores 332 to determine whether the entities communicate with malicious hosts. If the malware identification module 320 determines that an entity communicates with a host 160 having a reputation score indicating that the host is malicious, then the malware identification module 320 can determine that the entity itself is malicious. This determination can be made based on a combination with other suspicious behaviors or characteristics. For example, if an entity communicates with a host 160 having a reputation score indicating that the host is definitely malicious (i.e., a score of "1"), the malware identification module 320 can find that this communication alone is grounds for convicting the entity as malicious. If the entity communicates with a host 160 having a reputation score indicating that the host is possibly malicious (e.g., a score of "0.6"), the malware identification module 320 can use the existence of this communication, in combination with other suspicious behaviors performed by the entity, as grounds for convicting the entity. Similarly, the malware identification module 320 can use the fact that an entity communicates with only innocuous hosts 160 as evidence that the entity itself is innocuous.

Thus, the malware identification module 320 can convict an entity as a malware threat based on the malware threat information 310, the host reputation scores 332, and/or based on a combination of factors. Upon convicting an entity, an embodiment of the malware identification module 320 communicates information describing the conviction to the security server 110. The information describing the conviction can include information uniquely identifying the entity and information describing the factors that resulted in the conviction (e.g., the identity of a host with which the entity communicated, a description of the suspicious behaviors at the client, and/or a signature found in the entity). The malware identification module 320 may also perform remediation actions upon conviction of an entity such as removing the malware threat from the clients 150 or repairing files on the client 150.

The behavior monitoring module 330 monitors the behaviors and/or actions performed by the entities at the client 150. The monitored behaviors include the behaviors specified in the malware threat information and the identities of the hosts 160 with which the entities communicate. To this end, the behavior monitoring module 330 monitors the network traffic associated with the client 150 to identify communications with hosts 160 initiated by the entities and communications with entities initiated by hosts 160. In one embodiment, the behavior monitoring module 330 continuously monitors network traffic to identify communications initiated by all entities executing on the client. The behavior monitoring module 330 provides descriptions of the monitored behaviors/actions to the malware identification module 320.

In one embodiment, the behavior monitoring module 330 reports the monitored entity/host interactions to the security server 110. A report can include, for example, information uniquely identifying the entities and uniquely identifying the hosts 160 with which the entities communicate. Information used to uniquely identify an entity may include a name associated with the entity, a date stamp associated with the entity (e.g. a date when the entity was downloaded), a fingerprint associated with the entity, and any other type of data or metadata that can be used to uniquely identify the entity. Metadata that can be used to uniquely identify the entity can include: instructions performed by the entity, hashes generated from the entity, bit sequences generated from the entity, strings referenced in information associated with the entity and other entities associated with the entity. Information uniquely identifying hosts 160 may include: a name associated with the host 160, a country associated with the host 160, an internet protocol address associated with the host 160 and a uniform resource locator associated with the host 160.

The security server reporting module 360 communicates with the security server 110 via the network 114. The security server reporting module 360 serves as an intermediary that passes messages between the other modules in the security module 116 and the security server 110. Thus, the security server reporting module 360 receives the malware threat information 310 and host reputation scores 332 from the security server 110. The security server reporting module 360 also provides the information indicating the hosts 160 with which the entities communicate, and information describing malware threat convictions, to the security server 110.

Figure 4:
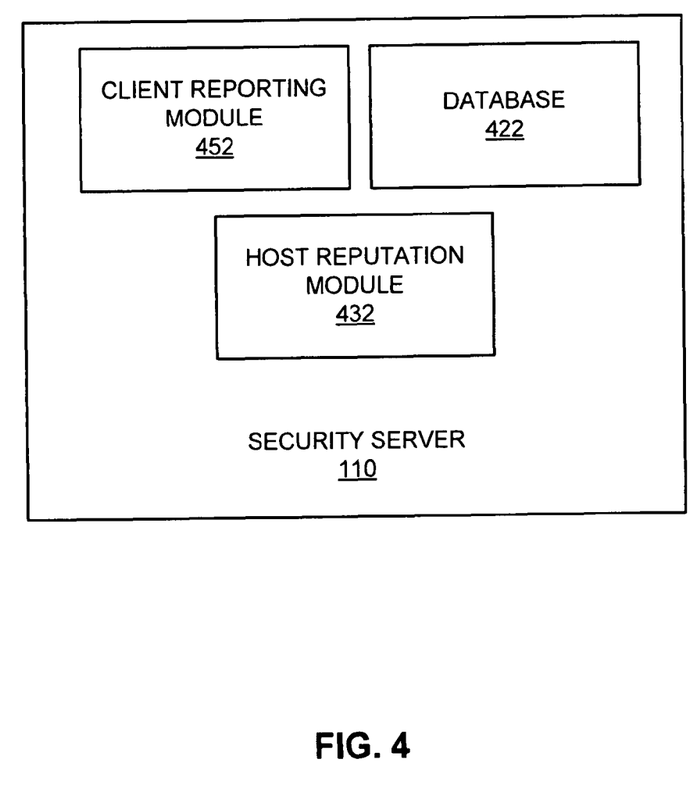
FIG. 4 is a high-level block diagram illustrating a detailed view of the security server 110 according to one embodiment.

FIG. 4 is a high-level block diagram illustrating a detailed view of the security server 110 according to one embodiment. As shown in FIG. 4, the security server 110 includes several modules. Those of skill in the art will recognize that other embodiments of the security server 110 can have different and/or other modules than the ones described here, and that the functionalities can be distributed among the modules in a different manner.

The client reporting module 452 communicates with the security modules 116 executing on the clients 150 to transmit and receive information. The client reporting module 452 receives information indicating the hosts 160 that the entities on the clients 150 communicate with in conjunction with information used to uniquely identify the entities and hosts 160. The client reporting module 452 further receives information indicating whether the entities on the clients 150 have been identified as malware threats. The client reporting module 452 stores the information received from the security modules 116 in the database 422.

The client reporting module 452 also transmits malware threat information 310 and host reputation scores 332 to the security modules 116. The client reporting module 452 can transmit the malware threat information 310 and/or host reputation scores 332 on a periodic basis (e.g. weekly, monthly) or whenever updates are made to the malware threat information 310 and/or host reputation scores 332 (e.g. when new host reputation scores are generated).

The database 422 stores the information indicating communications between the hosts 160 and entities and information indicating whether the entities have been identified as malware threats in association the information which uniquely identifies the hosts and entities. The database 422 also stores other information, such as the malware threat information 310 and the host reputation scores 332.

The host reputation module 432 generates host reputation scores 332 for hosts 160 based on the information associated with the hosts in the database 422. For each host 160 for which a score is generated, the host reputation module 432 identifies the entities with which the host 160 communicates. The host reputation module 432 further determines whether any of these entities have been convicted as malware threats. If all of the entities that a host 160 communicates with are malware threats, the host reputation module 432 assigns the host 160 a host reputation score indicating that the host 160 is a malicious host 160. If none of the entities that a host 160 communicates with are convicted malware threats, the host reputation module 432 assigns the host 160 a host reputation score indicating that the host 160 is an innocuous host 160.

If a host 160 communicates with a mix of malicious and innocuous entities, the host reputation module 432 can generate a score which indicates the likelihood that the host is a malicious host. In one embodiment, the host reputation module 432 determines the percentage of the entities that communicate with the host 160 that are malware threats and assigns the host 160 a host reputation score that corresponds to the percentage. For example, if 5% of the entities that communicate with the host 160 are malware threats, the host 160 may be given a host reputation score indicating a 5% likelihood of being a malicious host. In another embodiment, the host reputation module 432 determines the number of malware entities that communicate with the host 160 relative to the total number of entities that communicate with the host 160 and assigns the host 160 a host reputation score that reflects this ratio.

The host reputation module 432 stores the generated host reputation scores 432 in association with information which uniquely identifies the hosts 160 and communicates with the client reporting module 452 to transmit the scores and information to the clients 150. The host reputation module 432 also re-generates host reputation scores for the hosts 160 based on updates or changes to the information in the communications database 422. The host reputation module 432 may re-generate the host reputation scores on a periodic basis or whenever new information is added to the communications database 422.

Figure 5:
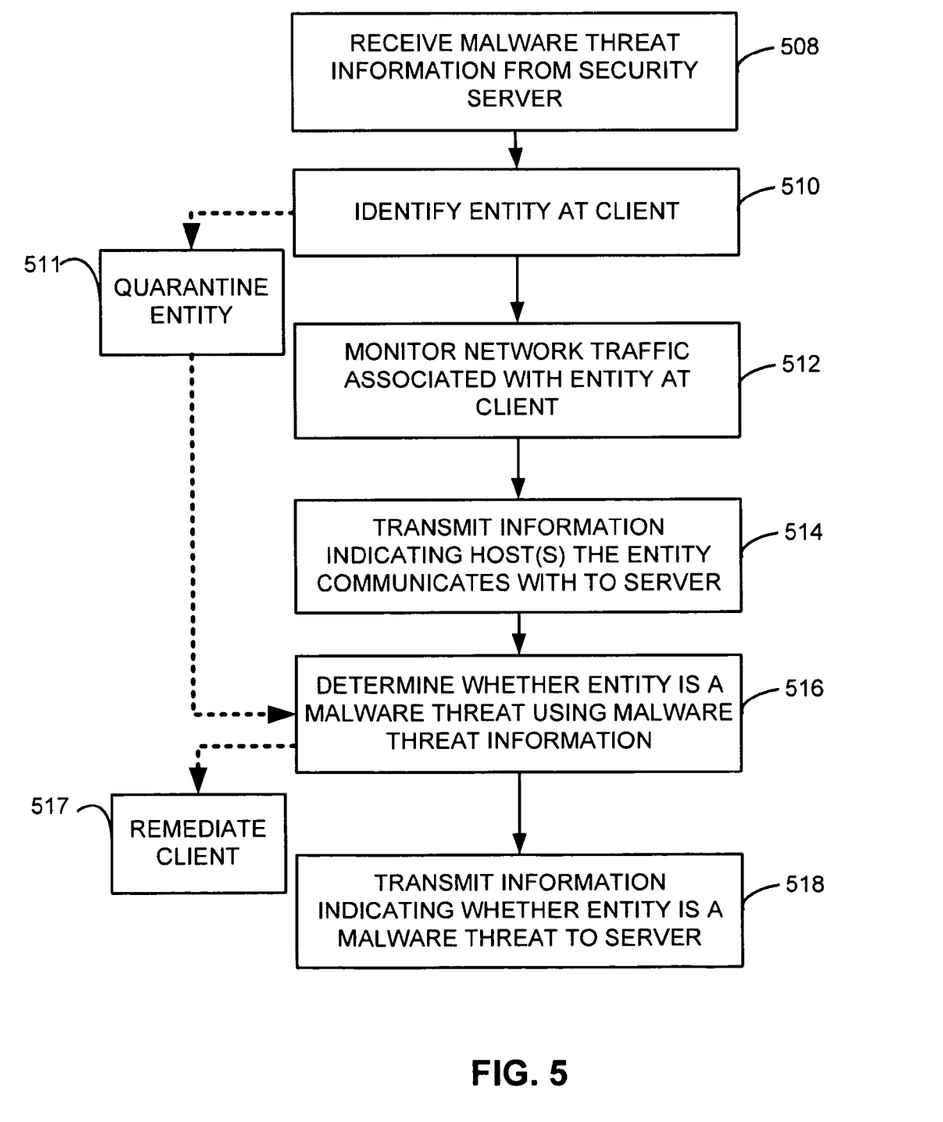
FIG. 5 is a flowchart illustrating steps performed by the security module 116 while interacting with the security server 110 according to one embodiment.

FIG. 5 is a flowchart illustrating steps performed by a security module 116 while interacting with the security server 110. Other embodiments perform the illustrated steps in different orders, and/or perform different or additional steps. Moreover, some of the steps can be performed by modules other than the security module 116.

The security module 116 receives 508 malware threat information 310 from the security server 110. The security module 116 identifies 510 an entity at the client 150. The entity can be identified by scanning the client 150 or by monitoring network traffic to detect communications associated with the entity. In some embodiments, the security module 116 quarantines 511 the entity in a secure or "sandbox" environment responsive to identifying the entity. The security module 116 monitors 512 network traffic associated with the entity to identify any hosts 160 with which the entity communicates. The security module 116 transmits 514 information indicating the set of hosts 160 that the entity communicates with in association with information uniquely identifying the entity and hosts to the security server 110. The security module 116 determines 516 whether the entity is a malware threat based on malware threat information 310. If the security module 116 determines that the entity is a malware threat, the security module 116 remediates 517 the client 160, for example, by removing the malware threat. The security module 116 transmits 518 information indicating whether the entity is a malware threat in association with information uniquely identifying the entity to the security server 110.

Figure 6:
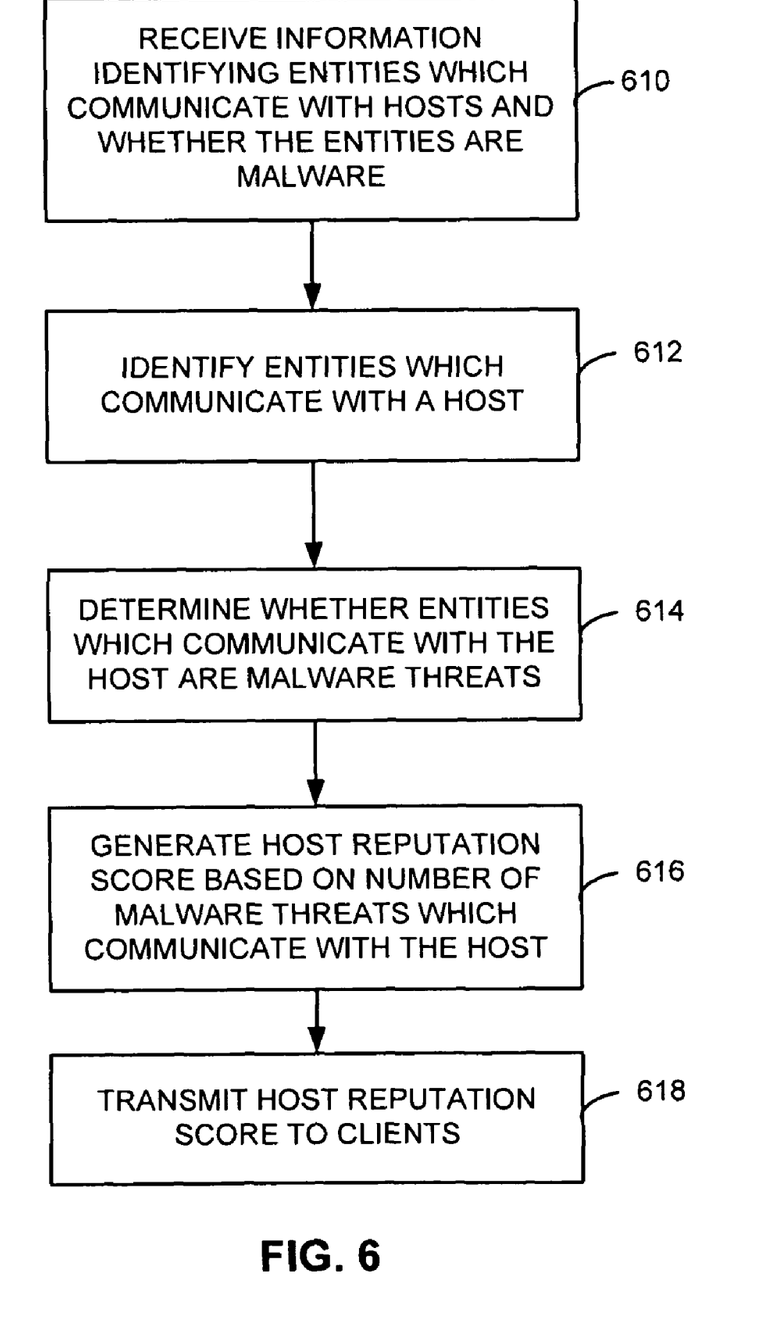
FIG. 6 is a flowchart illustrating steps performed by the security server 110 to generate host reputation scores according to one embodiment.

FIG. 6 is a flowchart illustrating steps performed by the security server 110 to generate host reputation scores according to one embodiment. Other embodiments perform the illustrated steps in different orders, and/or perform different or additional steps. Moreover, some of the steps can be performed by modules other than the security server 110.

The security server 110 receives 610 information identifying entities which communicate with hosts 160 and information indicating whether the entities have been identified as malware threats from the clients 150. The security server 110 identifies 612 the entities which communicate with a given host 160. The security server 110 determines 614 whether any entities which communicate with the host 160 have been identified as malware threats. The security server 110 generates 616 a host reputation score based on the number of malware threats that communicate with the host 160. The security server 110 transmits 618 the host reputation score to the security modules 116 executing on the clients 150.

Figure 7:
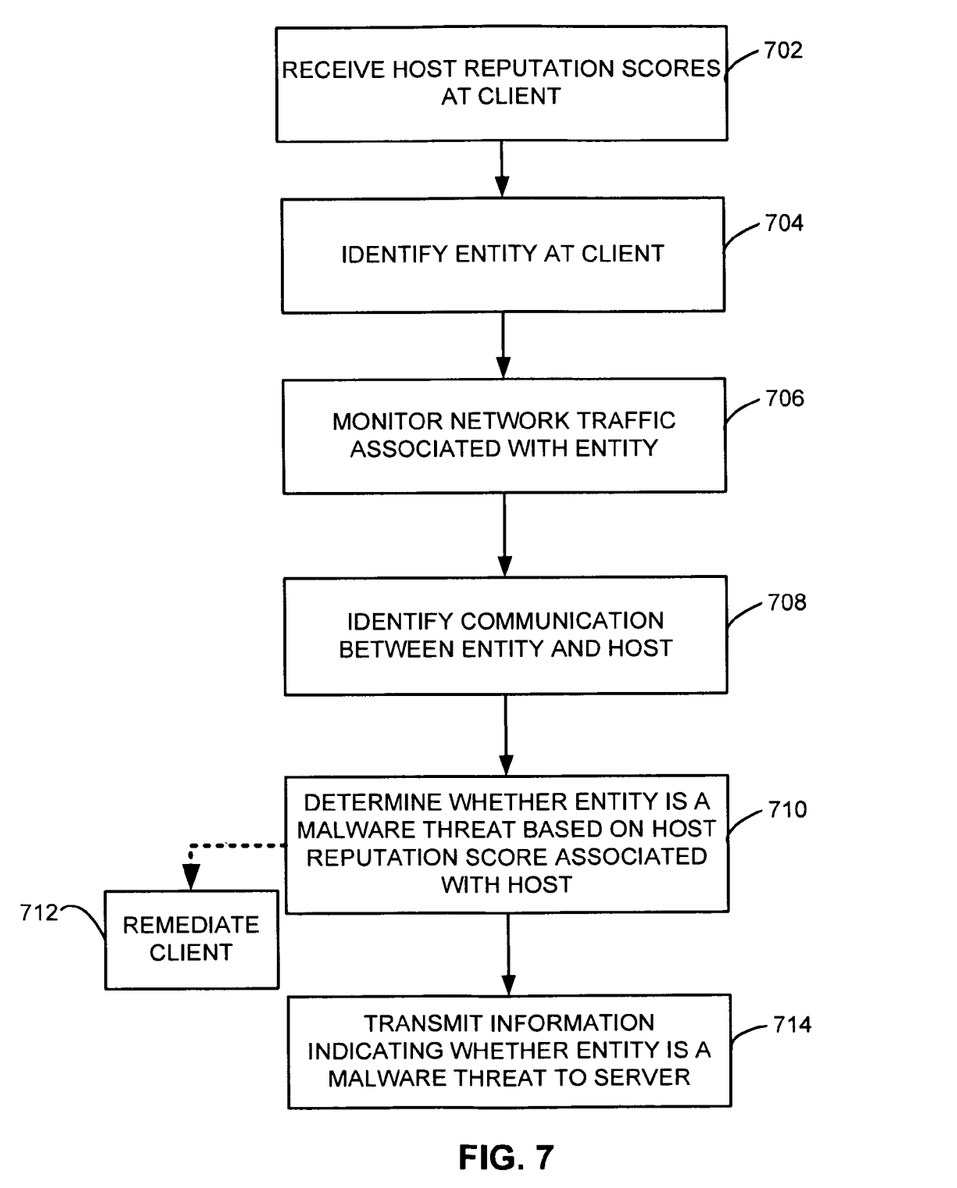
FIG. 7 is a flowchart illustrating steps performed by the security module 116 to determine whether an entity is a malware threat according to one embodiment.

FIG. 7 is a flowchart illustrating steps performed by the security module 116 to determine whether an entity is a malware threat. Other embodiments perform the illustrated steps in different orders, and/or perform different or additional steps. Moreover, some of the steps can be performed by modules other than the security module 116.

The security module 116 receives 702 host reputation scores for hosts 160 from the security server 110, the host reputation scores specifying likelihoods that the hosts 160 are malicious hosts. The security module 116 identifies 704 an entity at the client 150. The security module 116 monitors 706 network traffic associated with the entity. The security module 116 identifies 708 a communication between the entity and a host 160 based on the network traffic. The security module 116 determines 710 whether the entity is a malware threat based on the host reputation score associated with the host 160. If the security module 116 determines 710 that the entity is a malware threat, the security module remediates 712 the client 160, for example, by removing the malware threat. The security module 116 transmits 714 information indicating whether the entity is a malware threat in association with information uniquely identifying the entity to the security server 110.

The above description is included to illustrate one embodiment. The scope of the invention is to be limited only by the following claims. From the above discussion, many variations will be apparent to one skilled in the relevant art that would yet be encompassed by the spirit and scope of the invention.

The invention claimed is:

1. A computer system for generating a host reputation score for a host connected to a network, the computer system comprising:
    a memory;
    a processor;
    a reporting module stored on the memory and executable by the processor to:
        receive information identifying a plurality of hosts connected to the network and information describing communications between a plurality of entities executing on a plurality of clients and the plurality of hosts;
        receive information identifying one or more of the plurality of entities executing on the plurality of clients as malware threats; and
        provide generated host reputation scores to the plurality of clients; and a host reputation module stored on the memory and executable by the processor to:
    identify malware entities executing on
        the plurality of clients that
        communicate with the host based at least on the information
        identifying the plurality of hosts, the information describing
        communications between the plurality of entities executing on the
        plurality of clients and the plurality of hosts, and the information
        identifying one or more of the plurality of entities as malware threats;
        determine a number of the malware entities executing on
            the plurality of
            clients that communicate with the host; and
        generate the host reputation score for the host based at least on the
            number of the malware entities executing on the plurality of clients
            that communicate with the host
            wherein the host reputation
            score for the host indicates a likelihood that the host is malicious.

2. The computer system of claim 1, wherein the host reputation module is further executable to:
    identify a set of entities that communicate with the host based on the information describing the communications between the plurality of entities and the plurality of hosts;
    identify the malware entities as a subset of the set of entities that communicate with the host that are identified as malware threats.

3. The computer system of claim 2, wherein the host reputation module is further executable to:
    generate the host reputation score for the host based at least on a relationship between the set of entities that communicate with the host and the malware entities.

4. The system of claim 1, wherein the host reputation module is further executable to:
    generate the host reputation score for the host which indicates that the host is innocuous responsive to the number of the malware entities being zero.

5. A computer-implemented method of identifying a malware threat at a client, the method comprising:
    receiving a host reputation score indicating whether a host connected to the client by a network is malicious, wherein the host reputation score is determined by:
        identifying malware entities executing on a plurality of clients that communicate with the host based at least on information identifying a plurality of hosts, information describing communications between a plurality of entities executing on the plurality of clients and the plurality of hosts, and information identifying one or more of the plurality of entities as malware threats;
        determining a number of the malware entities executing on the plurality of clients that communicate with the host; and
        generating the host reputation score for the host based at least on the number of malware entities executing on the plurality of clients that communicate with the host;
    identifying an entity executing on the client that communicates with the host via the network; and
    determining, by a computer, whether the entity is a malware threat based at least on the host reputation score indicating whether the host connected to the client by the network is malicious.

6. The method of claim 5, wherein the host reputation score comprises a value describing a likelihood that the host is malicious.

7. The method of claim 5, wherein identifying an entity executing on the client that communicates with the host comprises:
    monitoring network communications of the client to identify entities executing on the client and hosts with which the entities communicate.

8. The method of claim 5, further comprising:
    receiving malware threat information identifying malicious entities;

wherein determining whether the entity is a malware threat is based at least on the malware threat information and the host reputation score.

9. The method of claim 5, further comprising:
transmitting information indicating that the entity is a malware threat to a security server, responsive to determining that the entity is a malware threat; and
receiving, from the security server, host reputation scores for one or more hosts, the host reputation scores generated by the security server based at least on the transmitted information.

10. The method of claim 9, further comprising:
transmitting information describing why the entity was convicted as a malware threat to the security server.

11. The method of claim 5, further comprising:
monitoring network communications involving the entity;
analyzing the monitored network communications to determine hosts with which the entity communicates;
providing identifiers of the entity and the hosts with which the entity communicates to a security server; and
receiving, from the security server, host reputation scores for the hosts with which the client communicates, the host reputation scores generated by the security server based at least on the identifiers of the entity and hosts provided to the security server.

12. The method of claim 5, wherein determining whether the entity is a malware threat based at least on the host reputation score comprises:
monitoring behaviors of the entity on the client;
analyzing the monitored behaviors in view of malware threat information describing behaviors performed by malware threats; and
determining whether the entity is a malware threat based at least on the analysis of the monitored behaviors.

13. A non-transitory computer-readable storage medium storing executable computer program code for identifying a malware threat at a client, the program code when executed by a processor causes the processor to perform the steps of:
receiving a host reputation score indicating whether a host connected to the client by a network is malicious, wherein the host reputation score is determined by:
identifying malware entities executing on a plurality of clients that communicate with the host based at least on information identifying a plurality of hosts, information describing communications between a plurality of entities executing on a plurality of clients and the plurality of hosts, and information identifying one or more of the plurality of entities as malware threats;
determining a number of the malware entities executing on the plurality of clients that communicate with the host; and
generating the host reputation score for the host based at least on the number of malware entities executing on the plurality of clients that communicate with the host;
identifying an entity executing on the client that communicates with the host via the network; and
determining whether the entity is a malware threat based at least on the host reputation score indicating whether the host connected to the client by the network is malicious.

14. The medium of claim 13, wherein the host reputation score comprises a value describing a likelihood that the host is malicious.

15. The medium of claim 13, wherein identifying an entity executing on the client that communicates with the host comprises:
monitoring network communications of the client to identify entities at the client and hosts with which the entities communicate.

16. The medium of claim 13, wherein the program code when executed by the processor further causes the processor to perform steps of:
receiving malware threat information identifying malicious entities;
wherein determining whether the entity is a malware threat is based at least on the malware threat information and the host reputation score.

17. The medium of claim 13, wherein the program code when executed by the processor further causes the processor to perform steps of:
transmitting information indicating that the entity is a malware threat to a security server, responsive to determining that the entity is a malware threat; and
receiving, from the security server, host reputation scores for one or more hosts, the host reputation scores generated by the security server based at least on the transmitted information.

18. The medium of claim 17, wherein the program code when executed by the processor further causes the processor to perform steps of:
transmitting information describing why the entity was convicted as a malware threat to the security server.

19. The medium of claim 13, wherein the program code when executed by the processor further causes the processor to perform steps of:
monitoring network communications involving the entity;
analyzing the monitored network communications to determine hosts with which the entity communicates;
providing identifiers of the entity and the hosts with which the entity communicates to a security server; and
receiving, from the security server, host reputation scores for the hosts with which the client communicates, the host reputation scores generated by the security server based at least on the identifiers of the entity and hosts provided to the security server.

20. The medium of claim 13, wherein determining whether the entity is a malware threat based at least on the host reputation score comprises:
monitoring behaviors of the entity on the client;
analyzing the monitored behaviors in view of malware threat information describing behaviors performed by malware threats; and determining whether the entity is a malware threat based at least on the analysis of the monitored behaviors.

* * * * *

UNITED STATES PATENT AND TRADEMARK OFFICE
CERTIFICATE OF CORRECTION

PATENT NO. : 8,381,289 B1
APPLICATION NO. : 12/416020
DATED : February 19, 2013
INVENTOR(S) : Shane Pereira et al.

Page 1 of 1

It is certified that error appears in the above-identified patent and that said Letters Patent is hereby corrected as shown below:

In the Claims:

Column 10, line 8, insert a -- , -- after "host".

Signed and Sealed this
Twenty-seventh Day of August, 2013

Teresa Stanek Rea
*Acting Director of the United States Patent and Trademark Office*